United States Patent
Sun et al.

(10) Patent No.: US 6,980,518 B1
(45) Date of Patent: Dec. 27, 2005

(54) GOSSIP-BASED RELIABLE MULTICAST MESSAGE RECOVERY SYSTEM AND METHOD

(75) Inventors: Qixiang Sun, Amarillo, TX (US); Daniel C. Sturman, Englewood Cliffs, NJ (US)

(73) Assignee: International Business Machines Corporation, Armonk, NY (US)

( * ) Notice: Subject to any disclaimer, the term of this patent is extended or adjusted under 35 U.S.C. 154(b) by 1053 days.

(21) Appl. No.: 09/602,230

(22) Filed: Jun. 23, 2000

(51) Int. Cl.[7] .............................. H04J 3/14; H04J 3/26; H04H 1/00; H04L 12/56
(52) U.S. Cl. ...................... 370/235; 370/312; 370/390; 370/432
(58) Field of Search ............................... 370/229, 235, 370/312, 389–390, 432

(56) References Cited

U.S. PATENT DOCUMENTS 6,603,972 B1 *  8/2003  Sawyer ........................ 455/442
6,724,770 B1 *  4/2004  Van Renesse ............... 370/432

OTHER PUBLICATIONS

"Bimodal Multicast", by Kenneth P. Birman, et al., ACM Transactions on Computer Systems, vol. 17, No. 2, May 1999, pp. 41-88.

* cited by examiner

Primary Examiner—Chi Pham
Assistant Examiner—Ronald Abelson
(74) Attorney, Agent, or Firm—Scully, Scott, Murphy & Presser; Douglas W. Cameron, Esq.

(57) ABSTRACT

A group-based multicast messaging system implementing dedicated logger member for logging all multicast messages sent in the system, and a reliable recovery method for missing messages. The reliable recovery method includes soliciting retransmissions of fresh missing messages to other group members and soliciting of retransmissions of stale missing messages to logger members of the group. One of the loggers or other group members repairs the missing message to thereby ensure reliable delivery of messages in the multicast messaging system. The soliciting of retransmissions makes use of negative gossips for fresh missing messages in the system, with the system implementing a mechanism for propagating the latest state information of members to enable garbage collection of archived messages at logging servers in the system. Further, employed is a selective hashing technique to further reduce control traffic and a relaxed group membership protocol for tracking multicast group membership.

34 Claims, 5 Drawing Sheets

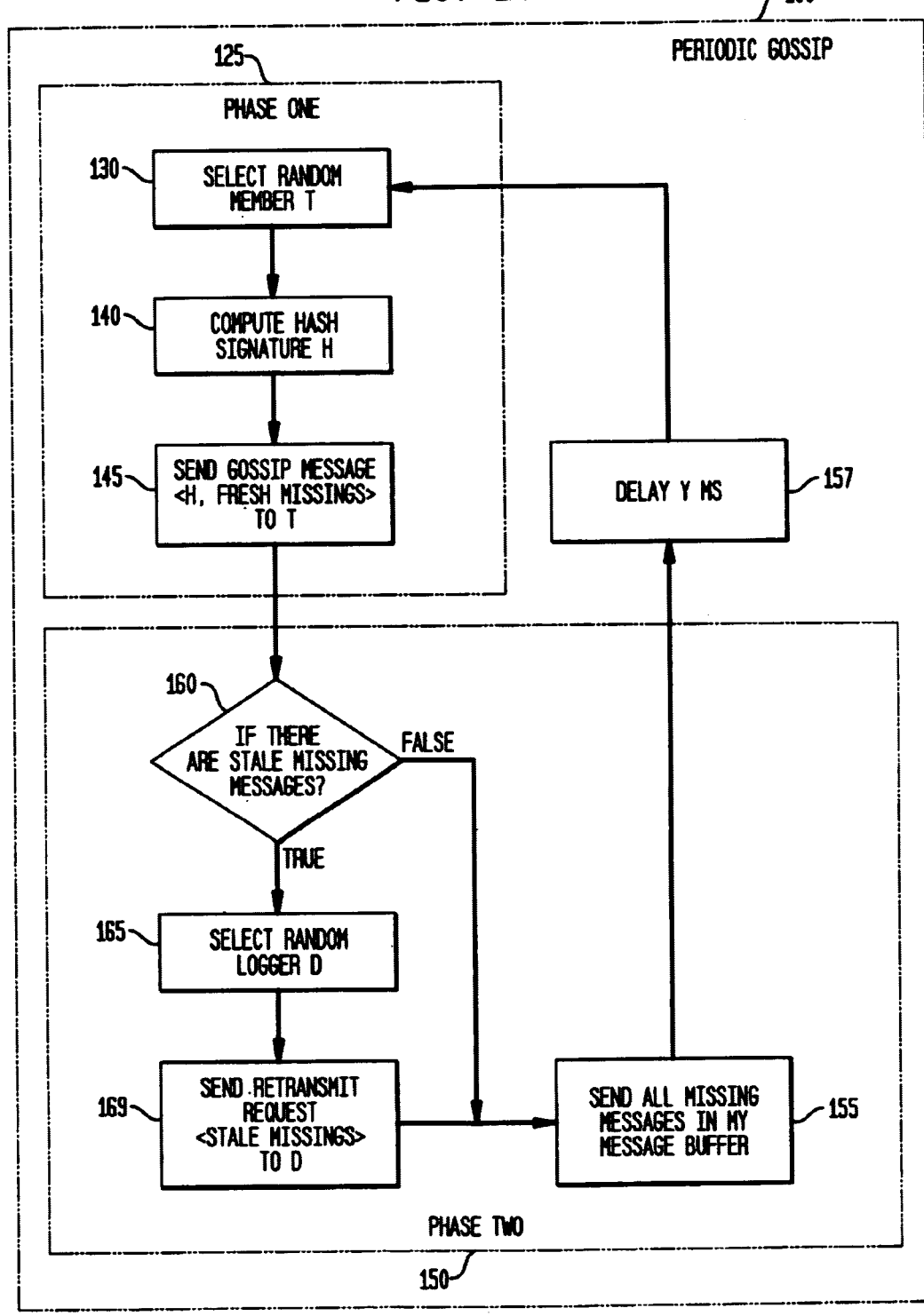

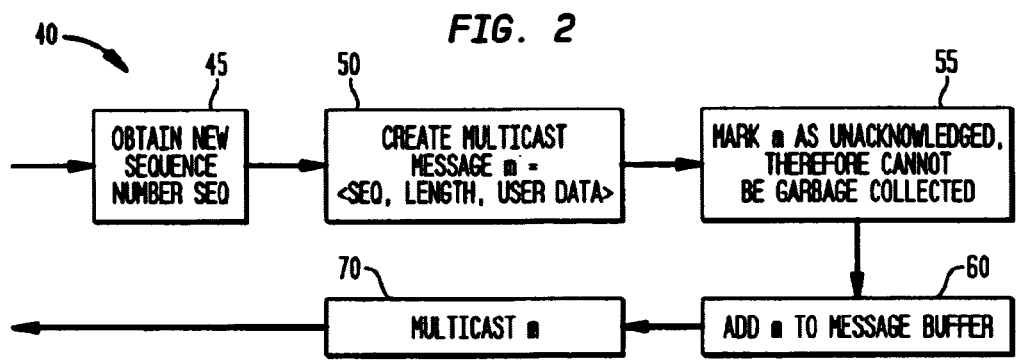
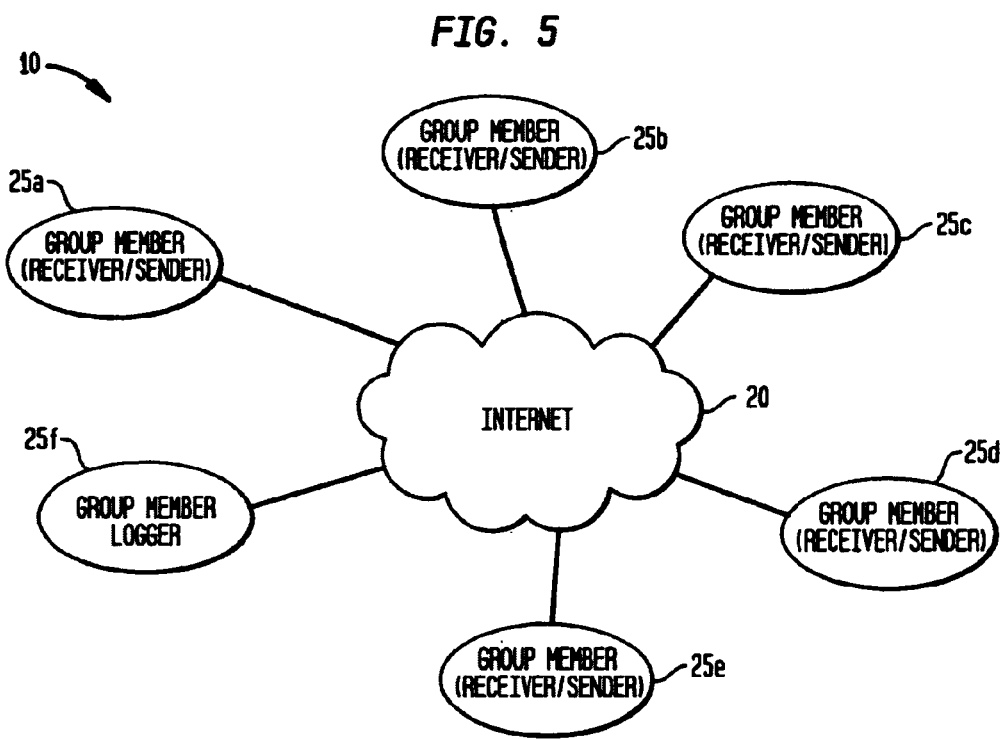

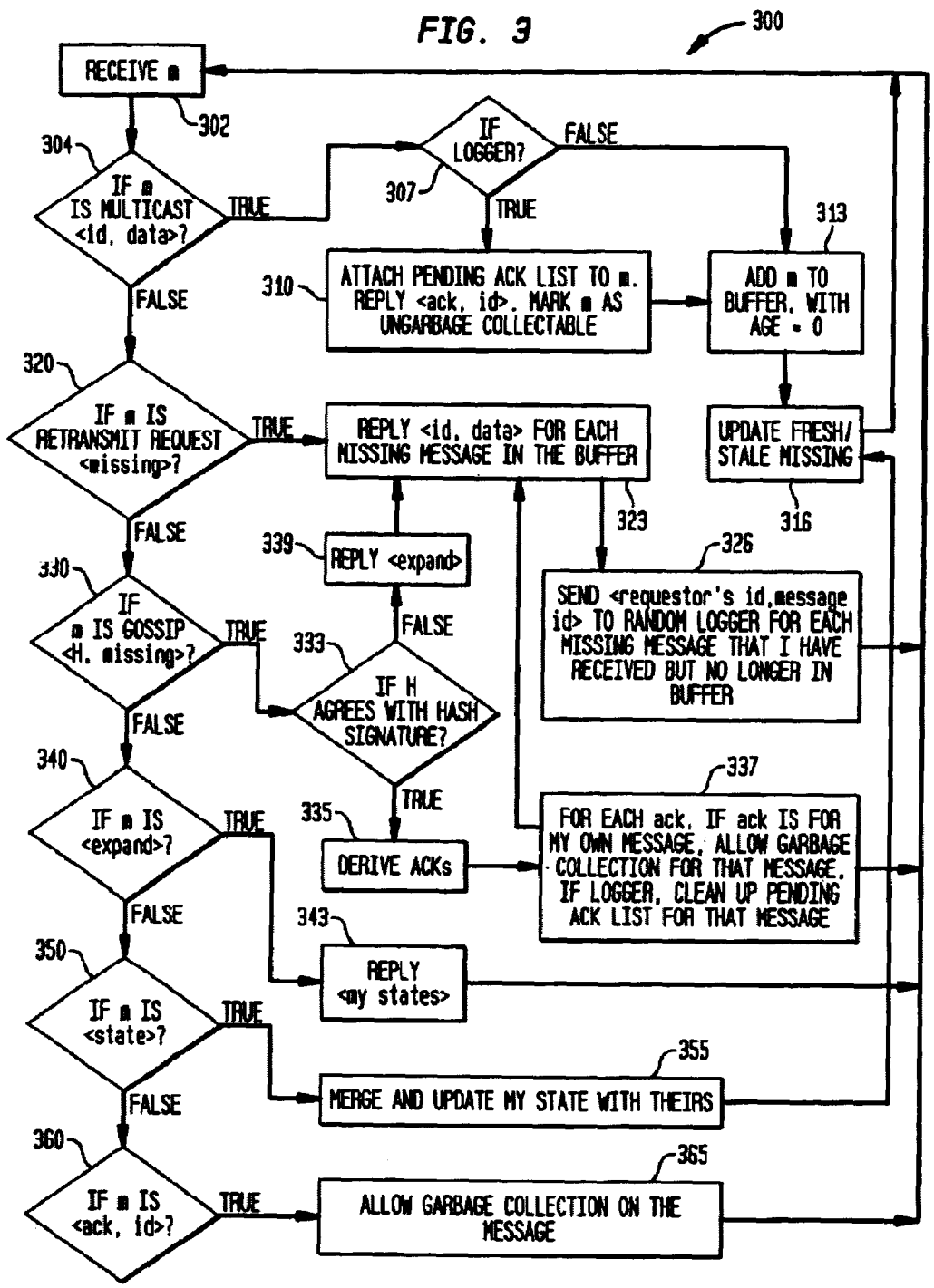

FIG. 4A MESSAGE ID:
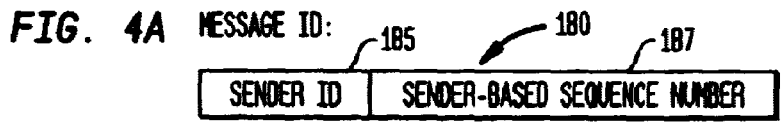
FIG. 4B RETRANSMIT REQUEST MESSAGE:
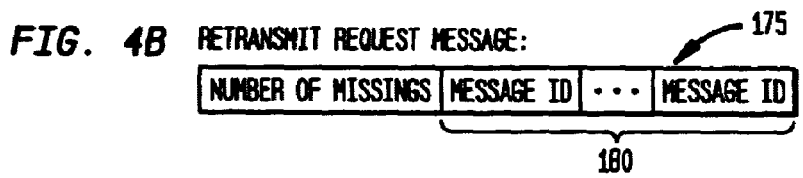
FIG. 4C GOSSIP MESSAGE:
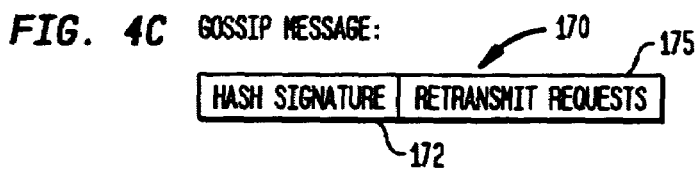
FIG. 4D MULTICAST MESSAGE:
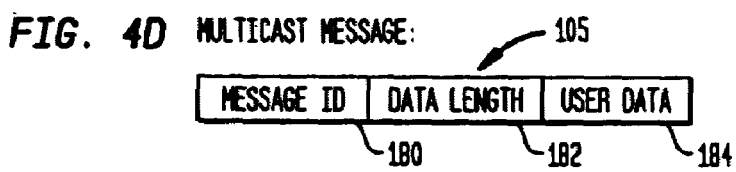
FIG. 4E EXPAND MESSAGE:
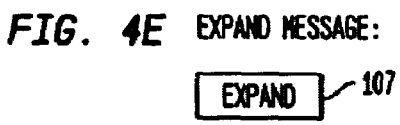
FIG. 4F STATE INFO:
FIG. 4G STATE MESSAGE:
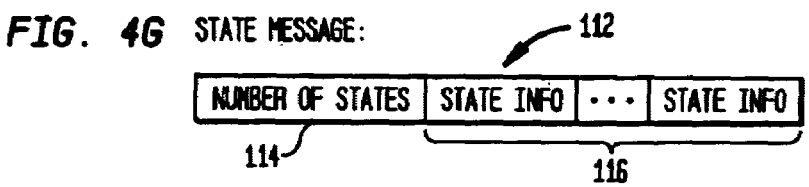
FIG. 4H LOGGER ACK MESSAGE:
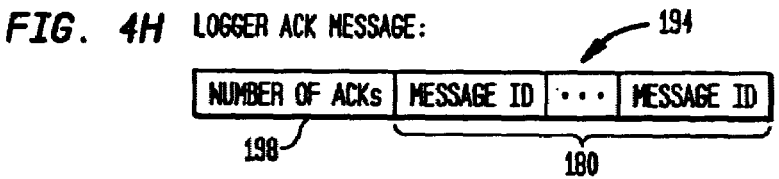

GOSSIP-BASED RELIABLE MULTICAST MESSAGE RECOVERY SYSTEM AND METHOD

BACKGROUND OF THE INVENTION

1. Field of the Invention

The present invention relates to data distribution systems and methods and, more particularly, to a reliable multicast message delivery system and method for achieving reliability while maintaining performance efficiencies in terms of low delivery latency, network traffic, and computational load.

2. Discussion of the Prior Art

In a multicast message delivery system, there typically exists one or more multicast groups, each multicast group having many senders and receivers exchanging information. Multicast is considered reliable if every sender message is delivered to all receivers in the group, even if some receivers are temporarily unavailable due to loss of connectivity or crashes.

Prior art multicast message delivery systems have either sacrificed performance to guarantee reliability or sacrificed reliability for better performance. A log-based receiver-reliable multicast ("LBRM") system such as described in H. Holbrook, S. Singhal, and D. Cheriton entitled "Log-based Receiver-reliable Multicast for Distributed Interactive Simulation", Proceeding of ACM SIGCOMM '95, 1995, provides reliable multicast by logging all messages on a dedicated logger or a hierarchy of loggers. A receiver, upon detecting a missing message, can contact a logger to recover the message. Unfortunately, loggers in LBRM are bottlenecks in the system. Under high message send rate situations, loggers will experience high latency, high network traffic, and high CPU load, and consequently slow down the entire system, hence limiting its performance. An alternative prior art approach is to spread the logging capability to all members of a multicast group. A Bimodal multicast ("Pbcast") system such as described in K. P. Birman, M. Hayden, O. Ozkasap, et al. entitled "Bimodal Multicast", ACM Transactions on Computer Systems, 17(2):41–88, May 1999 implements randomized gossips to approximate this idea. In this approach, each member of the multicast group will buffer received messages for some time. Instead of always asking dedicated loggers for repairs, Pbcast requires selecting random neighbors in the same multicast group and asks these neighbors to repair missing messages from their buffer. Given infinite amount of buffering space at each member, this approach will give the best performance. However, finite space forces each member to garbage collect buffered messages, hence providing no guarantee that a lost message can always be recovered by gossiping to neighbors. Various optimizations have been proposed to lengthen the buffering time, however, it is the case that these optimizations only increase the probability of delivering messages to all members rather than guaranteeing it.

It would be highly desirable to provide a hybrid multicast system that merges the ideas of logging messages and using random neighbors for repairing messages and further, that provides a strong reliable delivery guarantee as in LBRM, and, at the same time, preserves much of the performance advantages of a Pbcast system in most cases.

SUMMARY OF THE INVENTION

It is an object of the present invention to provide a hybrid multicast system that merges the ideas of logging messages and using random neighbors for repairing messages. Such a hybrid system will provide a strong reliable delivery guarantee as in LBRM, and, at the same time, additionally preserve much of the performance advantages of Pbcast in most cases.

It is another object of the invention to provide a hybrid multicast system that merges the ideas of logging messages and using random neighbors for repairing messages and implements negative gossips, hashing techniques, and a relaxed group membership protocol to improve performance and reliability.

According to one aspect of the invention, there is provided a reliable recovery system and methodology for a group-based multicast messaging system implementing dedicated logger member for logging all multicast messages sent by system group members, the recovery system and methodology comprising: mechanism in system group members for detecting one or more missing messages from a sequence of received multicast messages sent via the system and, for communicating requests for messages determined missing by a group member to another group member or logger; a mechanism for determining a status of a missing message indicated in a request as one of a fresh missing message and a stale missing message; a first phase repair mechanism for enabling repair of missing fresh messages by another group member; and, a second phase repair mechanism for enabling repair of missing stale messages by a logger member, wherein reliable delivery of messages in the multicast messaging system is ensured.

Preferably, in accordance with another aspect of the invention, use is made of negative gossips for soliciting retransmissions for fresh missing messages in the system, with the system propagating the latest state information of members to enable garbage collection of archived messages at logging servers in the system. Further, the step of propagating latest state information relies on a selective hashing technique.

Furthermore, in accordance with another aspect of the invention, use is made of a relaxed group membership protocol for tracking multicast group membership.

Advantageously, the gossip-based reliable recovery system and method of the invention enables reduction of control message traffic when used in very large networks, with many senders and receivers, high traffic rate, and intermittently connected receivers.

BRIEF DESCRIPTION OF THE DRAWINGS

Further features, aspects and advantages of the system and methods of the present invention will become better understood with regard to the following description, appended claims, and accompanying drawings where:

FIG. 1(a) is a block diagram illustrating the initiation of the two-phase retransmission scheme according to the principles of the invention.

FIG. 2 illustrates the mechanism processing a send request according to the principles of the invention.

FIG. 3 illustrates the derivation and processing of messages and acknowledgments in the processing thread according to the principles of the invention.

FIGS. 4(a)–4(h) illustrates the various message formats implemented in the preferred embodiments of the invention.

FIG. 5 depicts a sample environment for deployment of one embodiment of the invention and includes one or more group members comprising a specified multicast group, each group member including one of a sender, a receiver, or a logger.

DETAILED DESCRIPTION OF THE PREFERRED EMBODIMENT

Figure 1B:
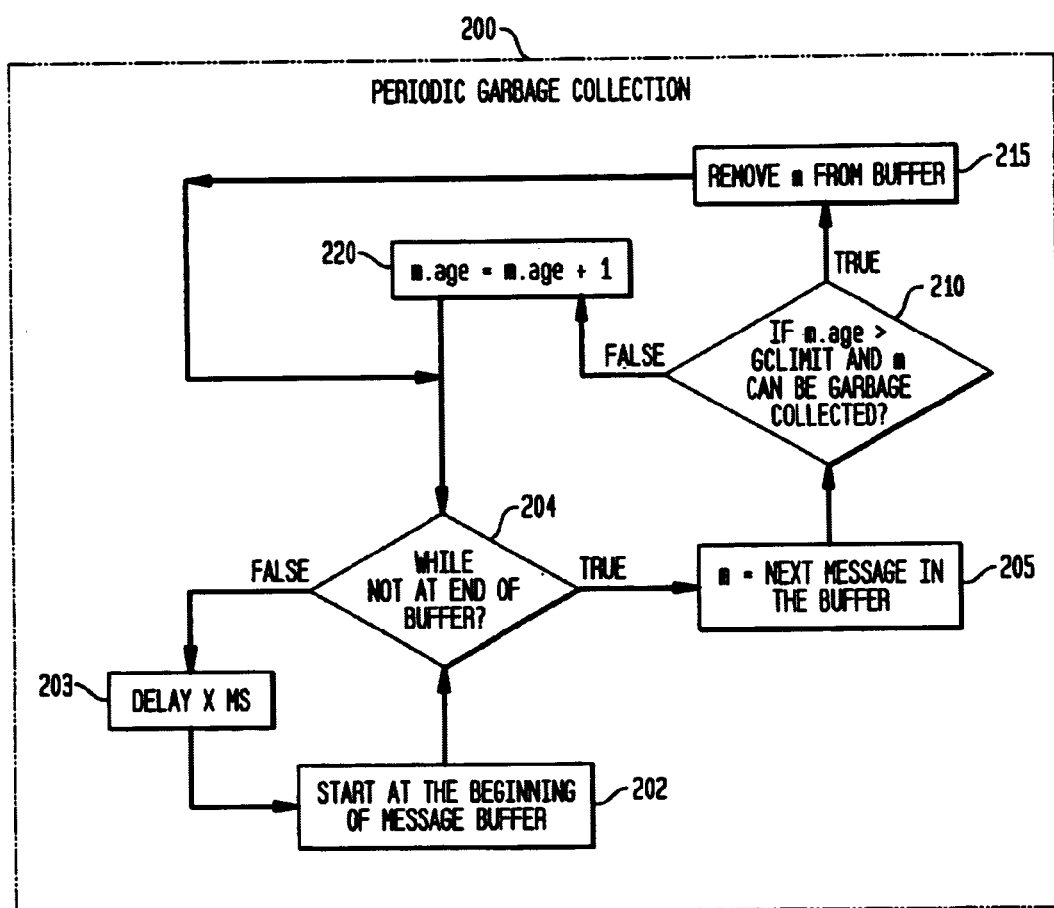
FIG. 1(b) is a block diagram illustrating the periodic garbage-collection thread for buffered messages.

As shown in FIG. 5, there is depicted a system 10 including a wide area network such as the Internet-based protocol (IP) network 20 and a plurality of connected group members 25a, . . . 25f of a specified multicast group. It is understood that, according to the invention, each group member may be a sender of a multicast message, a receiver of a multicast message, a logger, or any combination of these.

In an initial phase, a user introduces a new message for mass distribution into the system 10 via a send request. The method 40 for sending multicast messages is depicted in FIG. 2. As shown in FIG. 2, block 45 depicts the first step of obtaining a new sequence number "SEQ" for association with the message to be sent in accordance with the multicast transmission protocol. Then, the sender creates the multicast message "m" at block 50. As depicted in FIG. 4(d), a multicast message m 105 includes the message ID 180 including the new sequence number SEQ, the length of the message 182, and the user data 184, i.e., message payload. Returning to FIG. 2, at block 55, the message "m" is initially marked as unacknowledged to thereby prevent it from being garbage collected and, at block 60 is added to the message buffer. Finally, as indicated at block 70, the message "m" is multicast to the group, and thus enters the system.

According to the principles of the invention, once the message is in the system, a two-phase hybrid retransmission mechanism takes over to ensure reliable delivery of the multicast message to the group members. Before initiating any retransmission, a decision is first made as to whether a message(s) is missing and which message(s) is(are) missing. To detect a missing message, the system 10 implements the sender-based sequence numbers SEQ associated with each message. If a group member receives messages that results in a gap in the sequence number, then there is a missing message. A periodic broadcast of the last sequence number is necessary if a sender becomes idle. It is understood that, in this system, a receiver is also considered as an idle sender.

FIG. 1(a) illustrates how the two-phase retransmissions 100 are initiated according to a first aspect of the invention. As shown in FIG. 1(a), the retransmission strategy 100 is divided into two phases for each missing message. In the first phase of recovery 125, the system implements a randomized gossip approach to repair fresh missing messages. A missing message is fresh if it is determined that the time difference between the current time and the time of the actual multicast message send is within a fixed time period t, or the message is detected to be missing for the first time. If the first phase 125 fails to recover the message, a second phase of recovery 150 is implemented for contacting loggers within the group for retransmission of the now stale message. A message becomes stale if the time difference exceeds time period t.

The randomized gossiping in the first phase 125 operates as follows: First, as depicted at block 130, a Member A randomly selects another Member T to gossip to. Then, at step 145 Member A sends Member T a negative gossip message which is a gossip message that comprises all of that member's missing messages. If a degradation of performance is tolerable, it is understood that a member may transmit a positive gossip which describes a member's message buffer content. FIG. 4(c) illustrates a format of the gossip message 170 which comprises a hash signature 172 of relevant state information, and a retransmission request 175. The inclusion of a hash signature 172 is a first phase optimization depicted at block 140 in FIG. 1(a) which invokes a mechanism for hashing the member's state information (e.g., comprising message heartbeat information) to a signature of constant size H. Thus, referring back to FIG. 4(c), a simple negative gossip message comprises such as hash signature and a list of the missing messages. Upon receiving this negative gossip, member T may retransmit any of these missing messages that are determined to be fresh, i.e., that are currently in its message buffer as depicted at step 155.

Throughout the operation of this first phase, each member periodically frees buffer space that comprises the oldest messages when space limit is reached. Thus, it is the case that messages may become stale. Thus, the randomized approach needs further support to achieve reliability, which is provided by the operations supported in the second phase of recovery 150 depicted in FIG. 1(a).

In phase two 150 of the hybrid retransmission scheme of FIG. 1(a), at step 160, the Member T receiver determines whether there are stale missing messages. This may occur for instance, if a message in Member T's buffer has been "garbage-collected" as will be explained in greater detail hereinbelow. If a missing message has been classified as stale at step 160, the system simply selects a random logger D at step 165 and requests retransmission of the now stale messages at step 169 by sending a Retransmit Request message comprising the stale messages directly to the random logger D. FIG. 4(b) illustrates a format of the Retransmit Request message 175 which comprises a field 177 indicating the number of missing messages (which may comprise either stale in phase two recovery or fresh messages in phase one recovery), and their corresponding message Ids 180. FIG. 4(a) further illustrates that a Message ID 180 comprises a sender ID 185 and a sender-based sequence number SEQ 187. If at step 160, it is determined that there are no stale messages, then the process proceeds to step 155 where the Member A waits for retransmission by the selected group member of the missing fresh messages in Member A's message buffer. Alternately, after sending a retransmit request message for stale messages to the logger at step 169, the logger D to whom the retransmit request message (stale) was sent will just send all of the missing stale messages to Member A at step 155. This takes up some processing time as depicted by a delay 157. Regardless, however, as shown in FIG. 1(a), the process returns to step 130 of the phase one scheme of randomized gossiping 125.

As mentioned above, and, in further view of FIG. 1(b), it is understood that a garbage collection processing thread 200 is implemented for cleaning out each member's message buffers in accordance with known techniques. This garbage-collection thread 200 is implemented by each member (i.e., receivers) to periodically garbage collect its message buffer. Garbage collection is triggered by some predefined condition, for example, after an elapsed period of time, or after a predefined number of messages are currently stored in the message buffer. In a preferred embodiment, garbage collection is triggered by an elapsed period of time. Preferably, the garbage-collection process 200 begins at the beginning of each client's buffer at step 202. Each message m in the buffer is examined, in turn at step 205, with process continuing until an end of buffer is reached at step 204, where the process will again be triggered after a elapsed time delay 203. In the process 200, a determination of each message's age is performed at step 210 and is compared against an age threshold "GCLIMIT". If at step 210 it is determined that the message's age is greater than the GCLIMIT threshold, then that message is deleted from the buffer at step 215 and the process returns to step 204. If at step 210 it is determined that the message's age is not greater than GCLIMIT, its age is incremented at step 220 and the process returns to step 204.

It should be understood that an exception to the second phase of recovery occurs when a logger is missing a stale message. In this scenario, there are two possible cases: 1) the missing message failed to arrive at a logger; or, 2) the retransmit request message, at least, reached some other logger. For the first case, when the missing message failed to arrive at a logger, the logger may request retransmission from the sender directly. By use of acknowledgments, as will be described in greater detail hereinbelow, the sender is guaranteed to have the message if no logger has it. The second case only happens if the sender no longer has the message in its buffer. In this case, this logger will randomly contact other loggers as normal members would. From this description of the second phase, it may be deduced that the system guarantees that this message will eventually be delivered to all members in the group at the moment of send as long as the sender does not crash before its message arrives at a logger.

As mentioned hereinabove, there additionally exists a mechanism for periodically distributing state information that includes the latest sequence SEQ numbers. The LBRM protocol utilizes multicasted heartbeats for this purpose. In the invention, the state information may be carried for all senders in the gossip message. Thus, the simple gossip message 170 as shown in FIG. 4(c) comprises state information (e.g., sequence numbers) and missing messages, with the state information being hashed to a constant size. Preferably, the hashing technique assumes that the sender and receiver of a gossip message are most likely to agree on the latest sequence numbers. When disagreement happens, signaled by a difference in the hash signature, state information may be exchanged explicitly. To improve the effectiveness of hashing, only the state of idle senders is hashed, because sequence numbers (SEQ) are likely to differ for active senders due to varying latency which would render hashing useless as between those members. However, the system still includes active senders with a predetermined value as the sequence number in the hashing. This also enables membership information to be carried by both idle and active senders, at no cost, as will be described in greater detail hereinbelow. When using hashes, the following process is followed: Each group member maintains a hash of state information of all messages received from idle senders (idle is defined by not having received a message from that group member for some time t, for example 1 second). When a gossip is received from a gossiper, the hash in the message is compared to the receiver member's hash value. If the hashes match, then the gossiper's state information equals the receiver's state information. If the hash values do not match, then the receiver of the gossip sends a Reply <expand> message to the gossiper, an example <expand> message format of which is shown in FIG. 4(e), who replies with a state information message containing the explicit values of its state. This is explained in greater detail hereinbelow with respect to FIG. 3.

A further aspect of the gossip-based reliable recovery system of the invention is the efficient handling of missing message repairs given that all messages have been logged. To ensure each message is indeed reliably logged by at least one logging server, the system requires each sender to buffer their sent messages until receiving a confirmation, an acknowledgment (ACK) message, from some logging server. These ACK messages 194 have a message format such as depicted in FIG. 4(h) and are generated when a logging server receives a new message. There are no guarantees that an ACK message will arrive within a fixed time period because of network unpredictability. Therefore, there is a possibility that a sender cannot send new messages because its buffer is full. Typically, such situation implies that the network has been partitioned and there is no logging server in the same partition as the sender. Thus, stalling the sender is the only course of action until the partition is healed, if reliability is required. To make the system robust against lost ACK messages, the system permits senders to derive an ACK from the gossips in the two-phase retransmissions. As shown in FIGS. 4(a)–4(c), the gossips comprise two pieces of data: 1) the latest state information about the sequence numbers; and, 2) the gossiper's set of missing messages. From these two sets of data, the gossip recipient may derive which messages the gossiper, in this case a logger, has received, thus treating them as ACKs if it is waiting for acknowledgments. This mechanism enables a sender to derive ACKs from a logging server's gossip and solves the lost ACK problem.

FIG. 3 illustrates a member's receiving and processing thread 300 for all types of messages including the mechanism implemented for enabling senders to derive and process acknowledgments (ACKs). It is understood that the probability of a logger gossiping to a particular sender might be quite low. However, the methodology provides a sufficient failsafe mechanism for lost ACKs. As shown in FIG. 3, there is illustrated a first step 302 depicting a member's receipt of a message "m". At step 304, a member receiver (or logger) makes a determination as to whether the received message m is a multicast message, described above with respect to FIG. 4(d). If the message m is a multicast message, a determination is then made at step 307 to determine if the recipient is a logger. If the recipient is a logger, then at step 310, the logger will attach a pending ACK list to m which is a list of all current group members who must receive this message before the logger may dispose of it (i.e., garbage collect it). The logger additionally forwards an ACK reply message Reply<ACK, id> which is the acknowledgment from a logger to the sender of the message that allows the sender to garbage collect the message. FIG. 4(h) illustrates the content of a logger ACK message 194 which comprises an indication of the number of ACKs 198 and their corresponding message IDs 180. The message m is additionally marked as ungarbage collectable. Then, the process proceeds to step 313 to add the message m to the logger's buffer with an initial age of zero (0). If at step 307, the recipient is not a logger, then the message is added to that member's buffer with an initial age of zero (0) at step 313. Proceeding from step 313, that member (or logger) tracks its buffered fresh/stale missing messages at step 316. Returning to step 304, if the received message was not a multicast message, then a determination is made at step 320 to determine if the message m is a retransmit request for missing messages (FIG. 4(b)). If the m is a retransmit request, then at step 323, a reply message, Reply <id, data>, is sent which is the reply to repair a missing message and includes the missing messages as depicted in the phase two retransmission processing at step 155 (FIG. 1(a)). That is, Reply <id, data> is the reply generated in response to the negative gossip that implies a missing message (either in the gossip message itself or after an <expand> message, as will be explained in greater detail with respect to step 339). For any and each message that the receiver did not have in its buffer, then the receiver will randomly forward a message to another logger that will include the requesting members's id and the message id (of the missing message) at step 326. Returning to step 320, if the message m is not a retransmit request, then a determination is made at step 330 to determine if the message m is a gossip message comprising the hash signature of state data and the retransmit requests for missing messages (FIG. 4(c)). If the m is a gossip request, then at step 333, a determination is made as to whether the gossip target has the same hash signature H, i.e., whether both members agree on the latest SEQ number. If they both agree with the hash signature, then this means that no further information exchange is necessary and ACKs may be derived by the sender as indicated at step 335. If that is the case, then, at step 337, for each ACK, if the ACK is for that member's own message, than that message may be garbage-collected. If the member receiving the gossip message is a logger, then an optimization may be performed to "clean-up" the pending ACK list for that message which was attached to the message at step 310. After step 337 is performed, the process continues to steps 323, et seq., where the Reply <id, data> message comprising the message id and the data is sent for each missing message in the buffer. If at step 333 it is determined that H does not agree with the hash signature, then at step 339, the target will respond with a Reply <expand> message 107 such as illustrated in FIG. 4(e). This Reply <expand> message is simply the request for a state information message and has no content except the request. After step 339 is performed, the process continues to steps 323, et seq., where the Reply message comprising the message id and the data is sent for each missing message in the buffer. Returning to step 330, if the message m is not a gossip message, then a determination is made at step 340 to determine if the message m is an expand message such as generated at step 339. If the m is an expand message, then at step 343, the gossiper replies with a Reply <state> message. FIG. 4(g) illustrates the content of a state message 112 which to comprises the number of states 114 and the corresponding state information 116. As depicted in FIG. 4(f), the state information content 116 includes a sender ID 185, a Connectivity/membership status indication 190, the purpose of which will be explained in greater detail hereinbelow, and, the last known SEQ number 192. Referring back to FIG. 3, if at step 340, it is determined that the message m is not an expand message, then a determination is made at step 350 to determine if the message m is a state message such as generated at step 343. In response to receipt of a state message, at step 355, the member's state information is merged so that the gossiper's information is updated to obtain the latest state information (e.g., last sequence number). The process then proceeds to step 316 to track its buffered fresh/stale missing messages at step 316. Referring back to step 350, if it is determined that the message m is not an state message, then a determination is made at step 360 to determine if the message m is an Ack message such as generated at step 310. If the received message is an Ack message, then that message may be garbage-collected as indicated at step 365.

Loggers also are enabled to garbage collect old messages when all members have received them. To accomplish this, loggers are employed with a mechanism for determining and accessing an accurate view of the membership for each message. Essentially, loggers need acknowledgments from receivers to determine whether a message is safe to garbage collect. Explicit acknowledgments, as those from logger to sender, incur too much network traffic. Therefore, as mentioned, the system uses the alternative of deriving ACKs from gossip messages. This alternative has two advantages: first, no additional network bandwidth is needed; and, second, acknowledgments may be processed in batches. A possible drawback of using derived ACKs is longer delay in garbage collection in waiting for all the necessary gossips. However, the cost of increasing storage at logger nodes is lower than the extra network bandwidth cost. When all recipients of a message, as determined by the membership, have acknowledged arrival through their gossips, loggers may safely garbage collect the message. To ensure messages are not garbage collected by the logger to early, the following process is followed. For each new message received, the logger attaches a pending ACK list consisting of all id's of current members of the membership (group). When a logger receives a gossip from any group member that implies the group member has the message, i.e., by matching the state hash and not including the message id in the retransmit list, the logger deletes the group member's id from the pending ACK list for the message. Also, if the hash did not match, but the message id was not in the retransmit list, and if the logger sends an expand message to the group member (standard response to a mismatched hash) and receives back a state info message with a latest message id greater than the message id, it may also remove the group member id from the pending ACK list.

As known in the art, a common performance problem in group based systems is changing membership through joins and leaves. In accordance with the principles of the present invention, membership is needed for: 1) selecting gossip neighbors; and, 2) logger garbage collection. These needs do not warrant a heavy-weight view synchronous membership protocol but rather a relaxed version as now described. Particularly, for a member leave operation, its state must still be gossiped for others to learn about the departure. Therefore, the leaving member must confirm that a permanent member of the group, e.g., a dedicated logger of the group, will continue gossiping about the departure to other members on the behalf of the leaving member. This confirmation takes on the form of repeatedly requesting leave until an acknowledgment is received from a logger.

When a member joins the group, it not only has to let others know of its presence, but also determine its starting sequence number, e.g., the precise moment it joined the group, for receiving new messages. In the relaxed membership protocol according to the invention, a new member repeatedly broadcasts a join request to all members until someone gossips to the new member. Receiving this gossip signifies that an existing member has added the new member to its membership list and is propagating this information, through gossips, to others. The precise moment of joining is determined from the latest state information contained in that gossip. To avoid previous leaves interfering with the current join, the system attaches a unique and strictly increasing ID with each join. This ID can be the local clock, for instance.

The above relaxed membership protocol is sufficient for both selecting gossip neighbors and determining which members still need a message in logger garbage collection. Note that loggers derive ACKs from gossip messages which also contains an abbreviated membership through hashing as shown in FIG. 4(f). Therefore, loggers will learn of new members before processing the ACK and garbage collecting a message. To be conservative, loggers may add the new member to the list of recipients for all the messages currently in the log. When loggers receive direct gossips from the new member, they may proceed to clean up the list. The remaining detail is to ensure that no messages after the starting point of a new member is garbage collected before a logger learns of its presence. By construction, the starting point of a new member is the same as an existing member's latest sequence numbers. Thus, in order for a message after the starting point to be garbage collected, this existing member has to acknowledge to the logger through its gossip. However, any gossip from that existing member will contain the new member. As noted, loggers will have learned the new members presence from the gossip before garbage collecting this message.

While the invention has been particularly shown and described with respect to illustrative and preferred embodiments thereof, it will be understood by those skilled in the art that the foregoing and other changes in form and details may be made therein without departing from the spirit and scope of the invention which should be limited only by the scope of the appended claims.

Having thus described our invention, what we claim as new, and desire to secure by Letters Patent is:

1. In a group-based multicast messaging system implementing dedicated logger member for logging all multicast messages sent in said system, a method for reliably delivering messages from senders to receivers of said group, said method comprising steps of:
  a) collecting latest state information for all senders in said, said state information including latest sequence numbers transmitted by said senders;
  b) a receiver detecting a gap in said sequence of multicast messages received by a member of said group;
  c) soliciting retransmissions of missing messages to another member or logger of said group by generating a gossip message comprising a retransmission request of said missing message, said gossip message including said collected state information;
  d) selecting a member of said group and sending said gossip message to said selected member; and,
  e) determining said receiver's missing messages as fresh or stale, and one of: enabling repair of fresh missing messages by said another member in a first message recovery phase or, enabling repair of stale missing messages by a logger in a second message recovery phase, wherein reliable delivery of messages in said multicast messaging system is ensured.

2. The method as claimed in claim 1, wherein said missing message status is determined by comparing a time difference between a current time and the time of actual sending of said missing message in said system against a fixed time threshold,
  wherein when said time threshold has not been exceeded, assigning said fresh status to said missing message, otherwise, assigning said stale status to said missing message.

3. The method as claimed in claim 1, wherein said gossip message comprises a negative gossip comprising a member's missing messages.

4. The method as claimed in claim 1, further including the step of applying a selective hash function to said state information to generate a hash signature, and including said hash signature in said gossip message.

5. The method as claimed in claim 4, wherein said step b) of soliciting retransmission includes:
  generating a retransmission request for said missing message;
  randomly selecting a logger of said group; and,
  sending said retransmission request to said randomly selected logger.

6. The method as claimed in claim 5, wherein each logger member generates acknowledgment message for receipt by a sender member in response to logging a message received from said sender, said method further comprising the step of enabling a sender to further derive an acknowledgment from a received gossip message.

7. The method as claimed in claim 6, wherein each member maintains a hash signature of its own state, said deriving step including the step of: comparing said hash signature of a member's state with a hash signature embedded in said gossip message to determine which messages a gossiper has received for treatment as said acknowledgment.

8. The method as claimed in claim 5, further including the step of maintaining membership status of group members associated with multicast messages, said state information propagated in said gossip message further including embedded group membership status for said group members.

9. The method as claimed in claim 8, wherein each logger performs steps of:
  ascertaining views of group memberships for each message from said state information;
  determining if all members of said group has received the logged message; and,
  initiating garbage collection of said logged messages determined as being received by all said members.

10. The method as claimed in claim 9, wherein a logger member maintains a pending acknowledgment list comprising current group members associated with each new message received, said step of determining if all members of said group has received the logged message includes:
  deriving acknowledgments from state information included in said gossip messages; and,
  verifying receipt of the logged message for all members in said pending acknowledgment list.

11. A reliable recovery system for a group-based multicast messaging system implementing dedicated logger member for logging all multicast messages sent by system group members, said recovery system comprising:
  mechanism in system group members for detecting one or more missing messages from a sequence of received multicast messages sent via said system and, for communicating requests for messages determined missing by a group member to another group member or logger;
  mechanism for determining a status of a missing message indicated in a request as one of a fresh missing message and a stale missing message;
  first phase repair mechanism for enabling repair of missing fresh messages by another group member; and,
  second phase repair mechanism for enabling repair of missing stale messages by a logger member, wherein reliable delivery of messages in said multicast messaging system is ensured.

12. The reliable recovery system as claimed in claim 11, wherein a group member assigns a sequence number to each message, said detecting mechanism including a mechanism for determining a gap in sequence numbers of messages received by a member.

13. The reliable recovery system as claimed in claim 12, wherein said missing message status is determined by comparing a time difference between a current time and the time of actual sending of said missing message in said system against a fixed time threshold, wherein when said time threshold has not been exceeded, said message is assigned said fresh status, and otherwise, is assigned said stale status.

14. The reliable recovery system as claimed in claim 12, wherein said mechanism for communicating requests comprises:
   mechanism for generating a gossip message comprising said detected one or more missing messages;
   mechanism for randomly selecting a member of said group; and,
   transmit device for sending said gossip message to said randomly selected member.

15. The reliable recovery system as claimed in claim 14, wherein said gossip message comprises a negative gossip comprising a member's missing messages.

16. The reliable recovery system as claimed in claim 14, wherein said mechanism for generating a gossip message further comprises: a mechanism for collecting latest state information for all senders in said group and embedding said state information in a gossip message, said state information including latest sequence numbers transmitted by said senders.

17. The reliable recovery system as claimed in claim 16, further including mechanism for applying selective hash function to said state information to generate a hash signature for embedding in said gossip message.

18. The reliable recovery system as claimed in claim 17, wherein said mechanism for communicating requests comprises:
   mechanism for generating a retransmission request for said missing message;
   mechanism for randomly selecting a logger of said group; and,
   transmit device for sending said retransmission request to said randomly selected logger.

19. The reliable recovery system as claimed in claim 18, wherein each logger member includes mechanism responsive to a received message for generating an acknowledgment message for receipt by a sender member after logging said message, said system further comprising mechanism for enabling sender derivation of an acknowledgment from a received gossip message.

20. The reliable recovery system as claimed in claim 19, wherein each member maintains a hash signature of its own state, said deriving mechanism including mechanism for comparing said hash signature of a member's state with a hash signature embedded in said gossip message to determine which messages a gossiper has received for treatment as said acknowledgment.

21. The reliable recovery system as claimed in claim 17, further including implementation of a relaxed group membership protocol for maintaining membership status of group members associated with multicast messages, said state information further including embedded group membership status of said group members.

22. The reliable recovery system as claimed in claim 21, wherein each logger includes mechanism for ascertaining views of group memberships for each message from received state information and determining if all members of said group has received the logged message.

23. The reliable recovery system as claimed in claim 22, wherein each logger further includes garbage collection mechanism for removing said logged messages determined as being received by all said members.

24. The reliable recovery system as claimed in claim 23, wherein a logger member maintains a pending acknowledgment list comprising current group members associated with each new message received, said mechanism for determining if all members of said group has received the logged message including mechanism for deriving acknowledgments from state information included in said gossip messages and verifying receipt of the logged message for all members in said pending acknowledgment list.

25. A program storage device readable by a machine, tangibly embodying a program of instructions executable by the machine to perform method steps for reliably delivering messages from senders to receivers of a group based multicast messaging system, the system implementing a dedicated logger member for logging all multicast messages sent in said system, said method steps comprising:
   a) collecting latest state information for all senders in said group, said state information including latest sequence numbers transmitted by said senders;
   b) a receiver detecting a gap in said sequence of multicast messages received by a member of said group;
   c) soliciting retransmissions of missing messages to another member or logger of said group by generating a gossip message comprising a retransmission request of said missing message, said gossip message including said collected state information;
   d) selecting a member of said group and sending said gossip message to said selected member; and,
   e) determining said receiver's missing messages as fresh or stale, and one of: enabling repair of fresh missing messages by said another member in a first message recovery phase or, enabling repair of stale missing messages by a logger in a second message recovery phase, wherein reliable delivery of messages in said multicast messaging system is ensured.

26. The program storage device readable by a machine as claimed in claim 25, wherein said missing message status is determined by comparing a time difference between a current time and the time of actual sending of said missing message in said system against a fixed time threshold, wherein when said time threshold has not been exceeded, assigning said fresh status to said missing message, otherwise, assigning said stale status to said missing message.

27. The program storage device readable by a machine as claimed in claim 25, wherein said gossip message comprises a negative gossip comprising a members missing messages.

28. The program storage device readable by a machine as claimed in claim 25, further including the step of applying a selective hash function to said state information to generate a hash signature, and including said hash signature in said gossip message.

29. The program storage device readable by a machine as claimed in claim 28, wherein said step b) of soliciting retransmission includes:
   generating a retransmission request for said missing message;
   randomly selecting a logger of said group; and,
   sending said retransmission request to said randomly selected logger.

30. The program storage device readable by a machine as claimed in claim 29, wherein each logger member generates acknowledgment message for receipt by a sender in response to logging a message received from said sender, said method steps further comprising the step of enabling a sender to further derive an acknowledgment from a received gossip message.

31. The program storage device readable by a machine as claimed in claim 30, wherein each member maintains a hash signature of its own state, said deriving step including the step of: comparing said hash signature of a member's state with a hash signature embedded in said gossip message to determine which messages a gossiper has received for treatment as said acknowledgment.

32. The program storage device readable by a machine as claimed in claim 29, further including the step of maintaining membership status of group members associated with multicast messages, said state information propagated in said gossip message further including embedded group membership status for said group members.

33. The program storage device readable by a machine as claimed in claim 32, wherein each logger performs steps of:
ascertaining views of group memberships for each message from said state information;
determining if all members of said group has received the logged message; and,
initiating garbage collection of said logged messages determined as being received by all said members.

34. The program storage device readable by a machine as claimed in claim 33, wherein a logger member maintains a pending acknowledgment list comprising current group members associated with each new message received, said step of determining if all members of said group has received the logged message includes:
deriving acknowledgments from state information included in said gossip messages; and,
verifying receipt of the logged message for all members in said pending acknowledgment list.

\* \* \* \* \*